(12) United States Patent
Kuroda et al.

(10) Patent No.: US 7,195,010 B2
(45) Date of Patent: Mar. 27, 2007

(54) SPACE HEATER (75) Inventors: Shinji Kuroda, Nagoya (JP); Keiichi Ito, Nagoya (JP); Yoshinori Fujisawa, Nagoya (JP); Shinichi Yue, Nagoya (JP)

(73) Assignee: Rinnai Corporation, Nagoya (JP)

( * ) Notice: Subject to any disclaimer, the term of this patent is extended or adjusted under 35 U.S.C. 154(b) by 282 days.

(21) Appl. No.: 11/028,680

(22) Filed: Jan. 5, 2005

(65) Prior Publication Data
US 2005/0205080 A1 Sep. 22, 2005

(30) Foreign Application Priority Data
Jan. 6, 2004 (JP) ............... 2004-001441

(51) Int. Cl.
F24H 9/20 (2006.01)
F24H 3/02 (2006.01)
F24H 1/00 (2006.01)

(52) U.S. Cl. .............. 126/116 A; 126/110 E; 432/219

(58) Field of Classification Search ........... 126/116 A, 126/110 E, 110 A; 432/219, 222, 223
See application file for complete search history.

(56) References Cited

U.S. PATENT DOCUMENTS 6,382,305 B1 * 5/2002 Sano ............... 165/43
6,647,203 B1 * 11/2003 Helt et al. ............... 392/360

FOREIGN PATENT DOCUMENTS

EP 0330157 * 8/1989
JP 5-223248 A 8/1993

* cited by examiner

Primary Examiner—Alfred Basichas
(74) Attorney, Agent, or Firm—Birch, Stewart, Kolasch & Birch, LLP (57) ABSTRACT Disclosed is a space heater, with an air cleaning function, that monitors combustion at a burner, and prevents the halting of combustion due to the erroneous detection of a combustion abnormality. According to the present invention, a space heater includes: a heating unit control unit, which performs a "heating operation" for igniting fuel gas at a burner to operate a heating fan; an air cleaning unit control unit, which performs an "air cleaning operation" for operating an ion generator and an air cleaning fan; a combustion forced halt unit, for monitoring the combustion state of the burner based on a thermoelectromotive force TC generated by a thermocouple, and for halting combustion at the burner when the thermoelectromotive force TC drops, from a reference value TC_b, the equivalent of a determination level TC_j or more; and a reference value setup unit for, when the mode is shifted from an "independent heating mode", during which only the "heating operation" is performed, to a "synchronous operating mode", during which both the "heating operation" and the "air cleaning operation" are performed, designating as the reference value TC_b the thermoelectromotive force TC, generated by the thermocouple 16, that is stabilized after mode switch.

9 Claims, 8 Drawing Sheets

SPACE HEATER

BACKGROUND OF THE INVENTION

1. Field of the Invention

The present invention relates to a space heater that has an air cleaning function and that halts combustion at a burner when a combustion abnormality has occurred.

2. Related Background Art

There is, as an example, a well known gas space heater wherein a thermocouple is provided near a burner and combustion at the burner is controlled by monitoring the thermoelectromotive force generated by the thermocouple, and wherein, when the thermoelectromotive force is reduced to a predetermined reference value or lower, due to incomplete combustion at the burner or a misfire, combustion at the burner is forcibly halted. Furthermore, a gas space heater is proposed wherein such a reference value is designated based on the thermoelectromotive force generated by the thermocouple when the burner is in a stable combustion state, thereby preventing the erroneous halting of combustion at the burner when incomplete combustion or a misfire does not actually occur (e.g., Japanese Patent Laid-Open Publication No. Hei 05-223248).

Furthermore, a gas space heater having an air cleaning function has been developed in order to improve the convenience afforded users.

For a space heater having an air cleaning function, a heating fan for supplying air for combustion to a burner and an air cleaning fan for supplying air to an air cleaner must be separately provided in order to independently control the flow rate of the air supplied to the burner and the flow rate of the air supplied to the air cleaner. In addition, as the sizes of space heaters are reduced, there are cases wherein separate air intakes for the heating fan and for the air cleaning fan are located near each other, and cases wherein a single, common air intake is provided for both the heating fan and the air cleaning fan.

A space heater having an air cleaning function selectively performs, in a "synchronous operating mode", both heating and air cleaning, or performs, in an "independent heating mode", only heating. However, in both the "synchronous operating mode" and the "independent heating mode", combustion at the burner must be monitored.

For a space heater wherein the air intake for a heating fan and the air intake for an air cleaning fan are located near each other, and for a space heater wherein a single air intake is provided for the two fans, the present inventors found that even when a reference value for an abnormal combustion was designated while the burner was in a stable combustion state, sometimes a combustion abnormality was erroneously detected and combustion at the burner was halted.

It is, therefore, one objective of the present invention to provide a space heater that has an air cleaning function and that can, by monitoring the combustion state of a burner, prevent combustion at the burner from being halted due to the erroneous detection of a combustion abnormality.

SUMMARY OF THE INVENTION

To achieve this objective, the present invention relates to an improved space heater, comprising:

a burner;

a heating fan for taking in air through a first air intake and supplying the air to the burner, and for propelling, through a warm air grille, air heated by the burner;

an air cleaner;

an air cleaning fan for taking in air through a second air intake located in the vicinity of the first air intake and supplying the air to the air cleaner, and for propelling, through a clean air grille, air purified by the air cleaner;

an operation controller for selectively performing either a heating operation, during which combustion occurs at the burner while the heating fan is being operated, and an air cleaning operation, during which the air cleaner and the air cleaning fan are operated, in a synchronous operating mode, or only the heating operation in an independent heating mode;

a thermocouple for generating a thermoelectromotive force consonant with the combustion state of the burner; and a combustion forced halt unit for halting combustion at the burner when, during a heating operation, the thermoelectromotive force generated by the thermocouple is lower, by a predetermined determination level, than a predetermined reference value.

Further, provided for the space heater is a reference value setup unit for, when the mode is shifted from the independent heating mode to the synchronous operating mode and a thermoelectromotive force generated by the thermocouple is stabilized thereafter, determines that the thermoelectromotive force is the reference value (corresponds to claim 1).

According to this invention, when the mode is shifted from the independent heating mode to the synchronous operating mode and the air cleaning operation is started, and the air cleaning fan is operated and begins to take in air through the second air intake, the flow of air near the first air intake, which is located in the vicinity of the second air intake, fluctuates greatly momentarily, and changes continually thereafter. Because of the change in the flow of air, the flow rate is reduced for air drawn in by the heating fan, through the first air intake, and supplied to the burner. As a result, there is a case wherein the volume of the air supplied for combustion at the burner is reduced, and the thermoelectromotive force generated by the thermocouple becomes lower, by the predetermined determination level, than the reference value designated in the independent heating mode. Therefore, when the reference value designated in the independent heating mode continues to be employed following a shift from the independent heating mode to the synchronous operating mode, even though the indoor density of oxygen is not so low as to cause abnormal combustion at the burner and is sufficient to enable normal combustion, the combustion forced halt unit will erroneously detect oxygen depletion and halt combustion at the burner.

Therefore, when the mode is shifted from the independent heating mode to the synchronous operating mode, and when the thermoelectromotive force generated by the thermocouple is stabilized after the amount of air to be supplied for combustion at the burner has been reduced, the reference value setup unit defines the thermoelectromotive force as the reference value. As a result, the combustion forced halt unit can prevent the halting of combustion at the burner due to the erroneous detection of an abnormal combustion.

Furthermore, a single air intake is provided for use in common as the first air intake and the second air intake (corresponding to claim 2).

According to this invention, since the heating fan and the air cleaning fan take in air through the same air intake, when the independent heating mode is shifted to the synchronous operating mode and the air cleaning fan is activated, the reduction in the volume of air supplied to the burner by the heating fan is increased. Therefore, when the mode is shifted from the independent heating mode to the synchronous operating mode, it is especially effective for the reference value setup unit to designate, as the reference value, the thermoelectromotive force, generated by the thermocouple, that is stabilized after the mode has been shifted from the independent heating mode to the synchronous operating mode.

The space heater further comprises:

a first storage unit for storing the reference value used for the independent heating mode, wherein, immediately before the mode is shifted from the independent heating mode to the synchronous operating mode, the reference value setup unit stores, in the first storage unit, the reference value for the last independent heating mode, and when the mode is next shifted from the synchronous operating mode to the independent heating mode and then a thermoelectromotive force generated by the thermocouple is stabilized, compares the thermoelectromotive force with the reference value stored in the first storage unit, wherein, when the thermoelectromotive force is greater than the reference value stored in the first storage unit, the reference value setup unit determines that the thermoelectromotive force is a reference value for the present independent heating mode, and updates the reference value in the first storage unit, wherein, when the thermoelectromotive force is equal to or smaller than the reference value stored in the first storage unit, the reference value setup unit maintains the reference value in the first storage unit as a reference value for the present independent heating mode (corresponds to claim 3).

According to this invention, the reference value used in the independent heating mode is stored in the first storage unit. And when the independent heating mode and the synchronous operating mode are selectively performed, e.g., when the mode is shifted from the synchronous operating mode to the independent heating mode, the reference value setup unit compares the reference value, which was used in the preceding independent heating mode and is stored in the first storage unit, with the thermoelectromotive force generated by the thermocouple, which is stabilized after the mode has been shifted.

When the thermoelectromotive force is greater than the reference value stored in the first storage unit, it is assumed that the combustion state of the burner has been rendered satisfactory because an obstacle, such as a curtain, that partially blocked the first air intake in the preceding independent heating mode has now been removed from the first air intake, and the volume of the air supplied to the burner via the first air intake is increased. At this time, the reference value setup unit designates, as a reference value for the present independent heating mode, not the reference value that was previously used in the independent heating mode and is stored in the first storage unit, but the thermoelectromotive force, generated by the thermocouple, that is stabilized after the mode has been shifted from the synchronous operating mode to the present independent heating mode, wherein the combustion state of the burner is now satisfactory. As a result, the combustion forced halt unit can halt combustion at the burner based on a new reference value that is designated in accordance with the change in the combustion state of the burner.

When the thermoelectromotive force generated by the thermocouple, which is stabilized after the mode has been shifted from the synchronous operating mode to the independent heating mode, is equal to or smaller than the reference value stored in the first storage unit, it can be determined that the combustion state of the burner is either unchanged from the preceding independent heating mode, or has been degraded. At this time, the reference value setup unit designates, as a reference value, for the present independent heating mode, the reference value, stored in the first storage unit, for the preceding independent heating mode. As a result, the combustion forced halt unit can halt combustion at the burner in accordance with the degree to which the combustion state of the burner has been degraded from the state existing when the previous independent heating mode was started.

The space heater further comprises:

a unit for changing combustion quantity for the burner at a plurality of levels, wherein the reference value setup unit stores the reference value for the independent heating mode in the first storage unit for each of the combustion quantities for the burner at the individual levels, and wherein, when the mode is shifted from the synchronous operating mode to the independent heating mode, the reference value setup unit compares the thermoelectromotive force generated by the thermocouple at the time that the thermoelectromotive force is stabilized after the mode shift, with the reference value that is consonant with a combustion quantity for the burner that is stored in the first storage unit at the time of the mode shift (corresponds to claim 4).

According to this invention, in accordance with the combustion quantity for the burner, the reference value setup unit designates the reference value for the independent heating mode. Therefore, the reference value can be determined by reflecting the relationship between the thermoelectromotive force generated by the thermocouple and the combustion state of the burner, which varies in accordance with the combustion quantity, and the combustion forced halt unit can more accurately detect a combustion abnormality at the burner and halt the combustion process.

The space heater further comprises:

a unit for changing combustion quantity for the burner at a plurality of levels; and a first storage unit for storing the reference value for the independent heating mode, wherein, when the combustion quantity for the burner is changed in the independent heating mode, the reference value setup unit stores, for each of the combustion quantities for the burner at the individual levels, in the first storage unit, the reference value just before the change of the combustion quantity, wherein, when the combustion quantity for the burner is next changed, the reference value setup unit compares the thermoelectromotive force generated by the thermocouple at the time that the thermoelectromotive force is stabilized thereafter, with the reference value that is consonant with the combustion quantity for the burner after the change of the combustion quantity and is stored in the first storage unit, wherein, when the thermoelectromotive force is greater than the reference value stored in the first storage unit, the reference value setup unit determines that the thermoelectromotive force is a reference value for the present independent heating mode, and updates the reference value in the first storage unit, and wherein, when the thermoelectromotive force is equal to or smaller than the reference value stored in the first storage unit, the reference value setup unit maintains the reference value stored in the first storage unit as a reference value for the present independent heating mode (corresponds to claim 5).

According to this invention, when the combustion quantity for the burner is changed in the independent heating mode, the reference value setup unit compares with the reference value that is consonant with the preceding combustion quantity and is stored in the first storage unit, a reference value that is consonant with the combustion quantity for the burner that has newly been designated. As a result, the reference value can be determined in accordance with how combustion at the burner has been changed from the state wherein the preceding combustion quantity was effective to the state wherein the present combustion quantity is effective. Further, the combustion forced halt unit can more accurately detect a combustion abnormality at the burner and halt the combustion process.

The space heater further comprises:

a second storage unit for storing a reference value for the synchronous operating mode, wherein, when the mode is shifted from the synchronous operating mode to the independent heating mode, the reference value setup unit stores, in the second storage unit, the reference value for the last synchronous operating mode, and when the mode is next shifted from the independent heating mode to the synchronous operating mode and then a thermoelectromotive force generated by the thermocouple is stabilized, compares the thermoelectromotive force with the reference value stored in the second storage unit, wherein, when the thermoelectromotive force is greater than the reference value stored in the second storage unit, the reference value setup unit determines that the thermoelectromotive force is a reference value for the present synchronous operating mode, and updates the reference value in the second storage unit, and wherein, when the thermoelectromotive force is equal to or smaller than the reference value stored in the second storage unit, the reference value setup unit maintains the reference value in the second storage unit as a reference value for the present synchronous operating mode (corresponds to claim 6).

According to this invention, the reference value for the synchronous operating mode is stored in the second storage unit. When the shift from the independent heating mode to the synchronous operating mode is made, e.g., when the mode is shifted from the independent heating mode to the synchronous operating mode, the reference value setup unit compares the thermoelectromotive force generated by the thermocouple, which is stabilized following the mode shift, with the reference value that was used for the preceding synchronous operating mode and is stored in the second storage unit.

When the thermoelectromotive force is greater than the reference value stored in the second storage unit, it is assumed that for the burner a more satisfactory combustion state exists than in the preceding synchronous operating mode. Therefore, as a reference value for the present synchronous operating mode, the reference value setup unit does not designate the reference value for the preceding synchronous operating mode, which is stored in the first storage unit, but the thermoelectromotive force generated by the thermocouple, which is stabilized following the start of the present synchronous operating mode, in which the combustion state of the burner is satisfactory. As a result, the combustion forced halt unit can halt combustion at the burner by using a new reference value that is designated in accordance with the change in the combustion state of the burner.

When the mode is shifted from the independent heating mode to the synchronous operating mode, and the thermoelectromotive force generated by the thermocouple, which is stabilized thereafter, is equal to or smaller than the reference value stored in the second storage unit, it is determined that the combustion state of the burner is either unchanged or has been degraded, compared with the state that existed in the preceding synchronous operating mode. Therefore, as a reference value for the present synchronous operating mode, the reference value setup unit designates the reference value that was used for the preceding synchronous operating mode and is stored in the second storage unit. As a result, the combustion forced halt unit can halt combustion at the burner in accordance with the degree to which the combustion state of the burner has been degraded since the start of the preceding synchronous operating mode.

The space heater of the invention further comprises:

a unit for changing a combustion quantity for the burner at a plurality of levels, wherein the reference value setup unit stores the reference value for the synchronous operating mode in the second storage unit for each of the combustion quantity for the burner at the individual levels, and wherein, when the mode is shifted from the independent heating mode to the synchronous operating mode, the reference value setup unit compares the thermoelectromotive force generated by the thermocouple at the time that the thermoelectromotive force is stabilized after the mode shift, with the reference value that is consonant with a combustion quantity for the burner and is stored in the second storage unit (corresponds to claim 7).

According to the present invention, the reference value setup unit designates the reference value for the synchronous operating mode in accordance with the combustion quantity for the burner. As a result, the reference value is designated by reflecting the relationship between the combustion state of the burner, which fluctuates in accordance with the combustion quantity for the burner, and the thermoelectromotive force generated by the thermocouple. Further, the combustion forced halt unit can more accurately detect a combustion abnormality at the burner and halt the combustion process.

The space heater further comprises:

a unit for changing a combustion quantity for the burner at a plurality of levels; and a second storage unit for storing a reference value for the synchronous operating mode, wherein, when the combustion quantity for the burner is changed in the synchronous operating mode, the reference value setup unit stores, for each of the combustion quantities for the burner at the individual levels, in the second storage unit, a reference value used just before the change of the combustion quantity, wherein, when the combustion quantity for the burner is next changed, the reference value setup unit compares the thermoelectromotive force generated by the thermocouple at the time that the thermoelectromotive force is stabilized, with the reference value that is consonant with the combustion quantity for the burner after the change of the combustion quantity and is stored in the second storage unit, wherein, when the thermoelectromotive force is greater than the reference value stored in the second storage unit, the reference value setup unit determines that the thermoelectromotive force is a reference value for the present synchronous operating mode, and updates the reference value in the second storage unit, and wherein, when the thermoelectromotive force is equal to or smaller than the reference value stored in the second storage unit, the reference value setup unit maintains the reference value in the second storage unit as a reference value for the present synchronous operating mode (corresponds to claim 8).

According to this invention, when the combustion quantity for the burner is changed in the synchronous operating mode, the reference value setup unit compares the reference value consonant with the combustion quantity for the burner that is stored in the second storage unit, which is consonant with the preceding combustion quantity, with the reference value that is consonant with the present combustion quantity for the burner. Therefore, the reference value is designated in accordance with the change in the combustion state of the burner, i.e., the change between the state for the preceding combustion quantity and the state for the present combustion quantity. Furthermore, the combustion forced halt unit can more accurately detect a combustion abnormality at the burner and halt the combustion process.

The space heater further comprises:

a combustion quantity change unit for changing a combustion quantity for the burner; and a determination level change unit for reducing the predetermined determination level as the combustion quantity for the burner is increased (corresponds to claim 9).

According to the present invention, the thermoelectromotive force generated by the thermocouple varies not only in consonance with the combustion state of the burner, but also in consonance with the combustion quantity for the burner. As combustion at the burner is increased, the drop in the thermoelectromotive force generated by the thermocouple, due to the degrading of the combustion state, tends to be reduced. Therefore, as the combustion quantity for the burner is increased, the determination level change unit reduces the predetermined determination level to suppress an affect produced by a change in the combustion quantity for the burner, and the combustion forced halt unit can halt the combustion process.

DETAILED DESCRIPTION OF THE PREFERRED EMBODIMENTS

Figure 1:
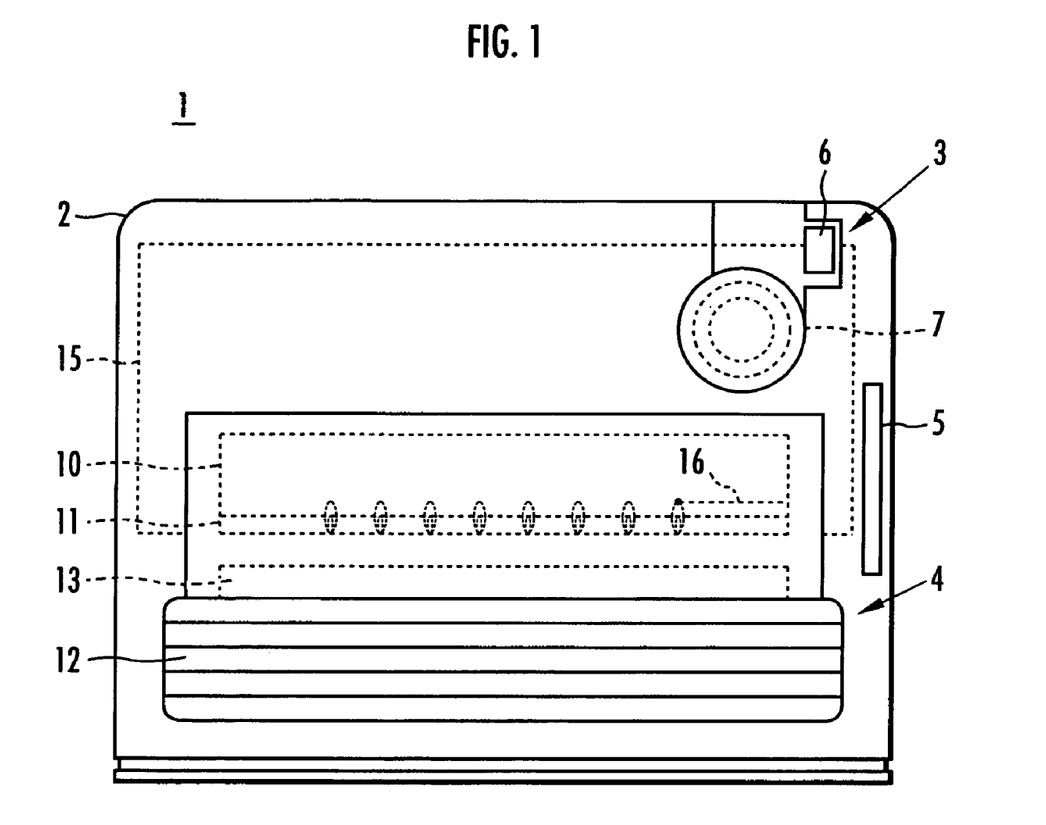
FIG. 1 is a front view of a gas space heater with an air cleaning function according to a first embodiment of the present invention.
Figure 2:
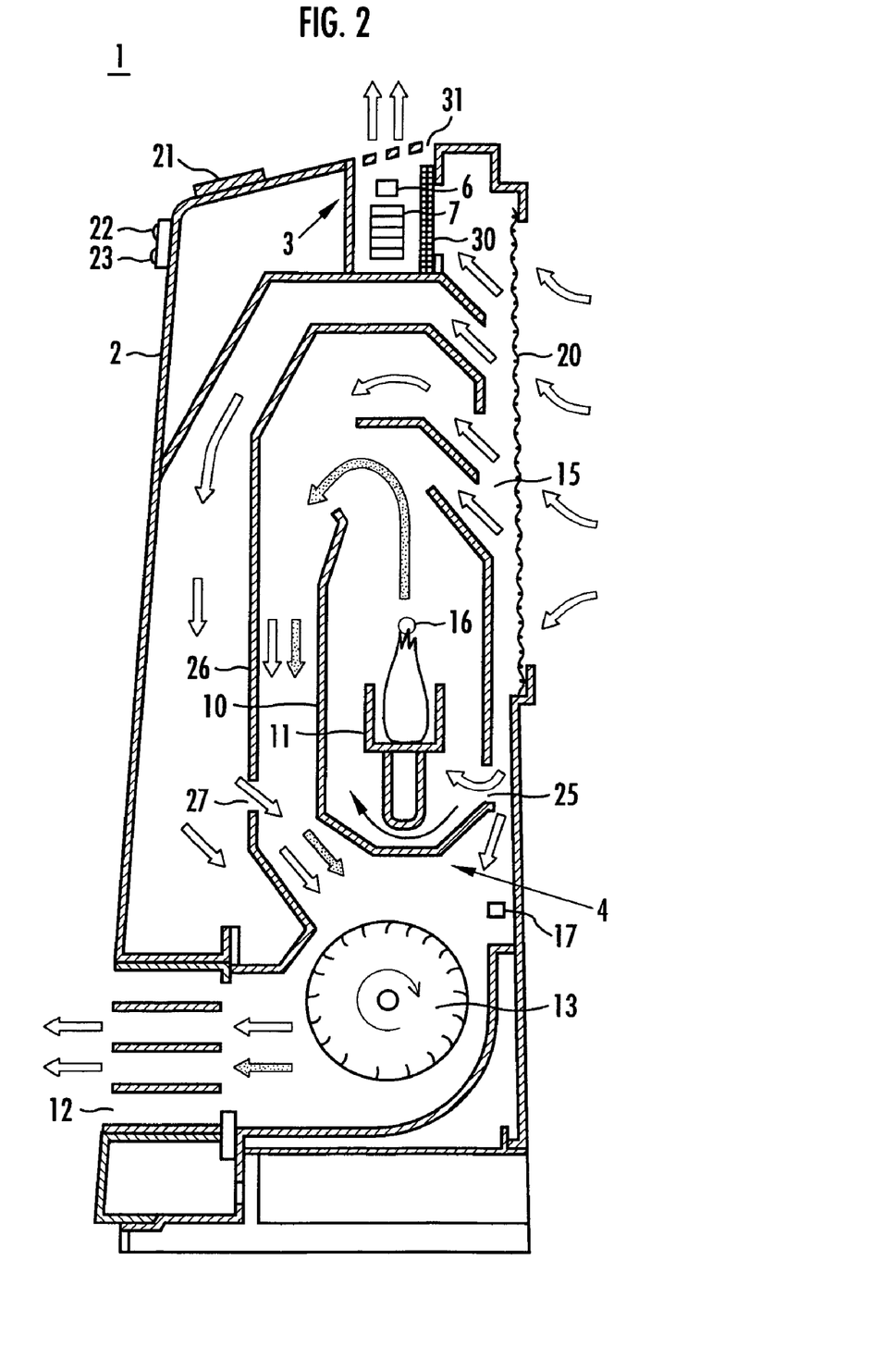
FIG. 2 is a cross-sectional view of the gas space heater in FIG. 1.
Figure 3:
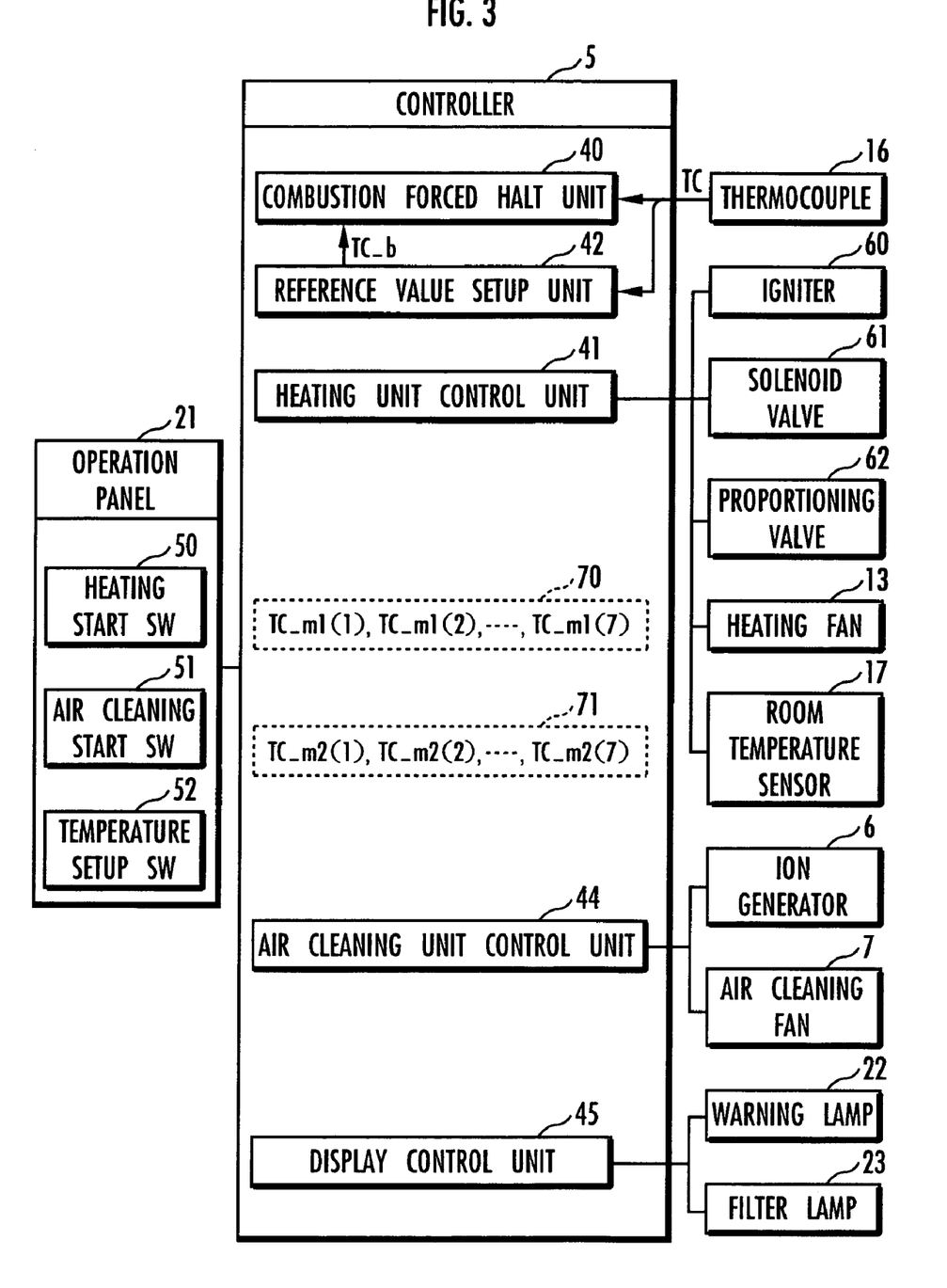
FIG. 3 is a control block diagram showing the gas space heater in FIG. 1.
Figure 6:
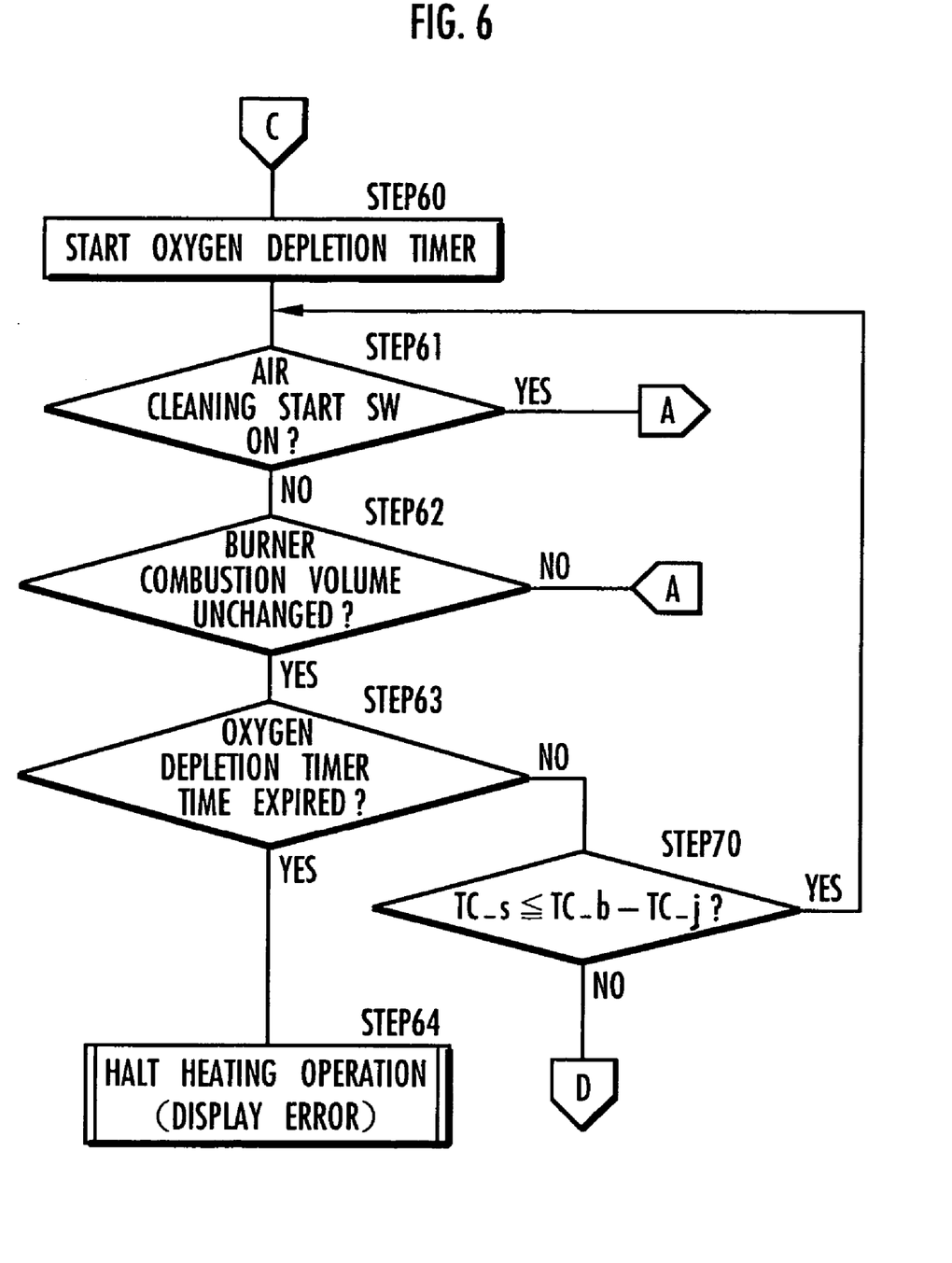
Figure 7:
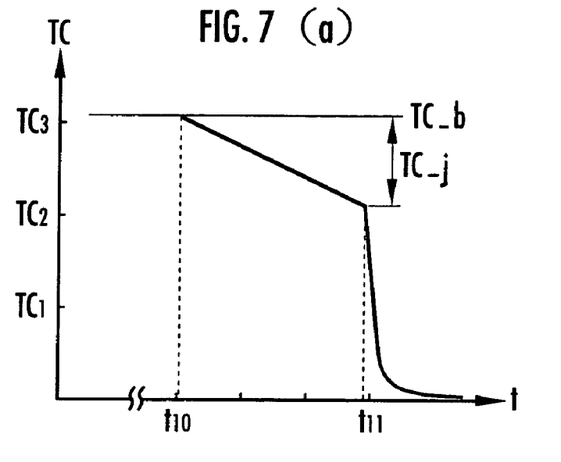
FIGS. 7(a) to 7(c) are graphs showing a change in the thermoelectromotive force generated by a thermocouple during the operation of the gas space heater in FIG. 1.

A first embodiment and a second embodiment of the present invention will now be described while referring to FIGS. 1 to 8. FIG. 1 is a front view of a gas space heater with an air cleaning function; FIG. 2 is a cross-sectional view of the gas space heater in FIG. 1; FIG. 3 is a control block diagram showing the gas space heater in FIG. 1; FIGS. 7(a) to 7(c) are graphs showing a change in the thermoelectromotive force generated by a thermocouple during the operation of the gas space heater; and FIGS. 4 to 6 and 8 are flowcharts showing the operation of the space heater.

First Embodiment

FIG. 1 is a front view of a gas space heater 1 (corresponding to a space heater according to the present invention) wherein the front panel of a body case 2 has been removed. The gas space heater 1 comprises: an air cleaning unit 3, a heating unit 4 and a controller 5 for controlling the operation of the gas space heater 1. The air cleaning unit 3 includes: an ion generator 6, for using plasma radiation to generate positive ions ($H^+$) and/or negative ions ($O_2^-$); and an air cleaning fan 7, of a sirocco type, for propelling outward, indoors, ions generated by the ion generator 6.

The heating unit 4 includes: a burner 11, arranged in a combustion case 10; and a heating fan 13, for supplying air for combustion to the burner 11, and for propelling indoors, through a warm air grille 12, air that is heated by the burner 11. A common air intake 15 (corresponding to a first air intake and a second air intake according to the invention) is provided in the rear face of the gas space heater 1, and the air cleaning fan 7 and the heating fan 13 take in indoor air through the common air intake 15. The heating unit 4 further includes: a thermocouple 16, for detecting the combustion state of the burner 11; a solenoid valve (not shown), for opening or closing a gas supply pipe (not shown) along which a fuel gas is supplied to the burner 11; a proportioning valve (not shown), for adjusting the opening of the gas supply pipe; an igniter (not shown), for igniting a fuel gas at the burner 11; and a room temperature sensor (not shown), for detecting room temperatures.

The controller 5 is an electronic unit, constituted, for example, by a microcomputer and a memory, that performs a "heating operation", for indoor heating, and an "air cleaning operation", for cleaning indoor air. There are three operating modes: an "independent heating mode", for performing only the "heating operation", an "independent air cleaning mode", for performing only the "air cleaning operation", and a "synchronous operating mode", for performing both the "heating operation" and the "air cleaning operation".

While referring to FIG. 2, a common air filter is detachably provided for the common air intake 15 to cover the entire face, and air drawn in through the common air filter 20 and the common air intake 15 is supplied to the air cleaning unit 3 and the heating unit 4. An operation panel 21, including various operating switches, is provided on the front of the upper face of the body case 2, and a warning lamp 22, for notifying a user that the air cleaning unit 3 or the heating unit 4 has been halted, and a filter lamp 23, for providing notification that the common air filter 20 requires cleaning, are provided on the upper portion of the front face of the body case 2.

When the "heating operation" is started, the controller 5 activates the heating fan 13 for the combustion of fuel gas at the burner 11. Then, the fuel gas is burned using secondary combustion air, which is drawn in at the common air intake 15 and supplied, via a secondary combustion air inlet 25, to a combustion chamber 10, and primary combustion air that is drawn in at a primary combustion air inlet (not shown). Gas generated by combustion passes from above the burner 11, through the upper portion of the combustion chamber 10, and is discharged.

The combustion gas discharged from the upper portion of the combustion chamber 10 and air drawn in through the common air intake 15 are mixed, between a partition 26 and the combustion chamber 10. Furthermore, to cool the body case 2, part of the air drawn in through the common air intake 15, by the rotation of the heating fan 13, flows downward between the body case 2 and the partition 26, whence it is supplied to the heating unit 4 through a slit 27. Then, in the heating unit 4, the air is mixed with an air mixture flowing in from the top, and the resultant mixed air is propelled indoors, at an appropriate temperature, through the warm air grille 12.

When the "air cleaning operation" is started, the controller 5 activates the air cleaning fan 7 and the ion generator 6. And a dust collection filter 30, located behind the air cleaning unit 3, captures dust particles that are not removed by the common air filter 20. Together with the air supplied via the dust collection filter 30, the air cleaning fan 7 propels out, through a clean air grille 31, ions (positive ions and/or negative ions) generated by the ion generator 6. The ions so dispersed are used to disinfect indoor air.

While referring to FIG. 3, the controller 5 is connected to the operation panel 21, the thermocouple 16, an igniter 60, a solenoid valve 61, a proportioning valve 62, the heating fan 13, a room temperature sensor 17, the ion generator 6, the air cleaning fan 7, the warning lamp 22 and the filter lamp 23. The controller 5 controls the operation of the air cleaning unit 3 and the heating unit 4 in accordance with control signals that the controller 5 receives from a heating start switch 50, an air cleaning start switch 51 and a temperature setup switch 52 on the operation panel 21.

The controller 5 further includes: a combustion forced halt unit 40, a heating unit control unit 41, a reference value setup unit 42, an air cleaning unit control unit 44 and a display control unit 45. A first memory 70 (corresponding to the first storage unit according to the invention) and a second memory 71 (corresponding to the second storage unit according to the invention) will be described later while referring to a second embodiment of the present invention.

During the "heating operation", the combustion forced halt unit 40 monitors a thermoelectromotive force TC generated by the thermocouple 16, and halts combustion at the burner 11 when there is a reduction, equivalent to a predetermined determination level TC_j, in the thermoelectromotive force TC, which has a predetermined reference value TC_b.

The heating unit control unit 41, to perform the "heating operation", controls the operations of the igniter 60, the solenoid valve 61, the proportioning valve 62 and the heating fan 13. For the "heating operation", the heating unit control unit 41 performs a "temperature adjustment" process during which the combustion quantity for the burner 11 is changed to one of seven levels (corresponds to a plurality of levels in accordance with the present invention), the first level (the lowest) to the seventh level (the highest), in accordance with a difference between a target temperature, designated by manipulating the temperature setup switch 52, and a temperature detected by the room temperature sensor 17, so that the two temperatures correspond.

The combustion quantity for the burner 11 is altered by changing the amount of fuel gas supplied to the burner 11 via the proportioning valve 62 and the amount of air supplied to the burner 11 by the heating fan 13. The proportioning valve 62 and the heating fan 13 respectively correspond to the means of the invention for changing the combustion of the volume of the burner at a plurality of levels and the means of the invention for changing the combustion quantity for the burner.

The air cleaning unit control unit 44 controls the operations of the ion generator 6 and the air cleaning fan 7 to perform the "air cleaning operation". And the display control unit 45 turns on/off the warning lamp 22 and the filter lamp 23.

Figure 4:
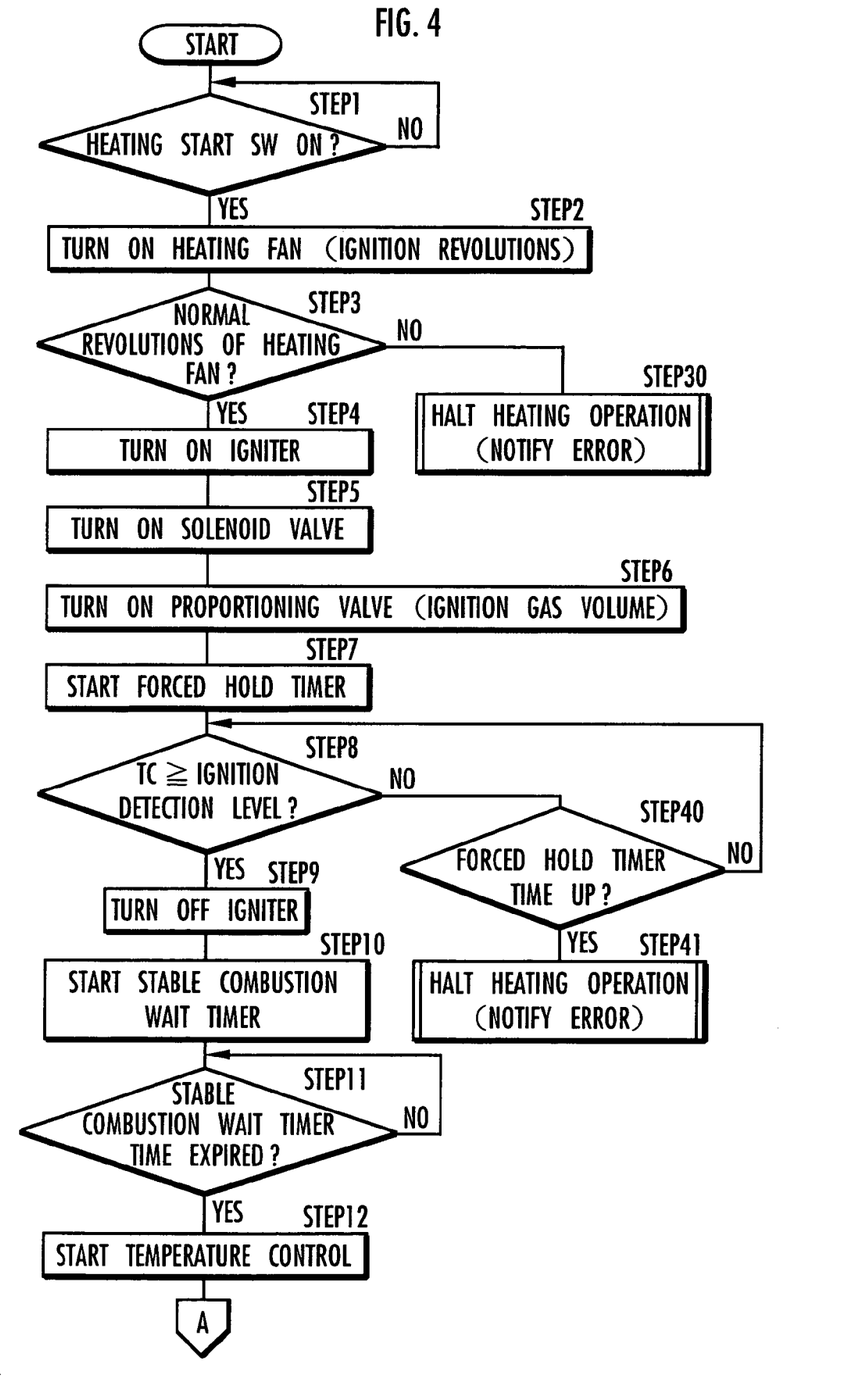
FIGS. 4 to 6 are flowcharts showing the operation of the space heater in FIG. 1.

While referring to the flowcharts in FIGS. 4 to 6, an explanation will be given for the processing performed by the heating unit control unit 41, the reference value setup unit 42 and the combustion forced halt unit 40 in the "independent heating mode" and in the "synchronous operating mode". The processing in FIG. 4 is performed by the heating unit control unit 41. When a user turns on the heating start switch 50 at STEP 1, the "heating operation" is started at STEP 2, and the heating unit control unit 41 ignites the fuel gas at the burner 11.

At STEP 2, the heating unit control unit 41 starts the revolution of the heating fan 13 at a predetermined ignition speed. When at STEP 3 the heating fan 13 is revolving normally, at near the predetermined ignition speed, the igniter 60 is turned on at STEP 4, the solenoid valve 61 is opened at STEP 5, the opening of the proportioning valve 62 is adjusted in accordance with a predetermined amount of gas to be ignited at STEP 6, and the gas at the burner 11 is ignited. When the heating fan 13 is not revolving normally, program control branches to STEP 30 to halt the "heating operation". At this time, an abnormal operation notification is provided by the display control unit 45 using the warning lamp 22.

At STEP 7, the heating unit control unit 41 starts a forced hold timer to determine whether ignition at the burner 11 has occurred, and performs the loop at STEPs 8 and 40. At STEP 8, a check is performed to determine whether the thermoelectromotive force TC generated by the thermocouple 16 has attained a predetermined ignition detection or higher level. When the thermoelectromotive force TC has attained the ignition detection or higher level, at STEP 9 the igniter 60 is turned off. When at STEP 8 the thermoelectromotive force generated by the thermocouple 16 has not reached the ignition detection level, program control branches to STEP 40 to determine whether the time designated for the forced hold timer has expired.

When the time designated for the forced hold time has not expired, program control returns to STEP 8. When the time designated for the forced hold timer has expired, i.e., when at STEP 8 ignition at the burner 11 is not detected within the period (e.g., thirty seconds) set for the forced hold timer, at STEP 41, the heating unit control unit 41 halts the "heating operation". At this time, an abnormal operation notification is provided by the display control unit 45 using the warning lamp 22.

When ignition at the burner 11 is detected, at STEP 10, the heating unit control unit 41 starts a stable combustion wait timer. When the time designated for the stable combustion wait timer has expired at STEP 11, at STEP 12, the heating unit control unit 41 starts the "temperature adjustment" process and program control advances to STEP 13 in FIG. 5.

Figure 5:
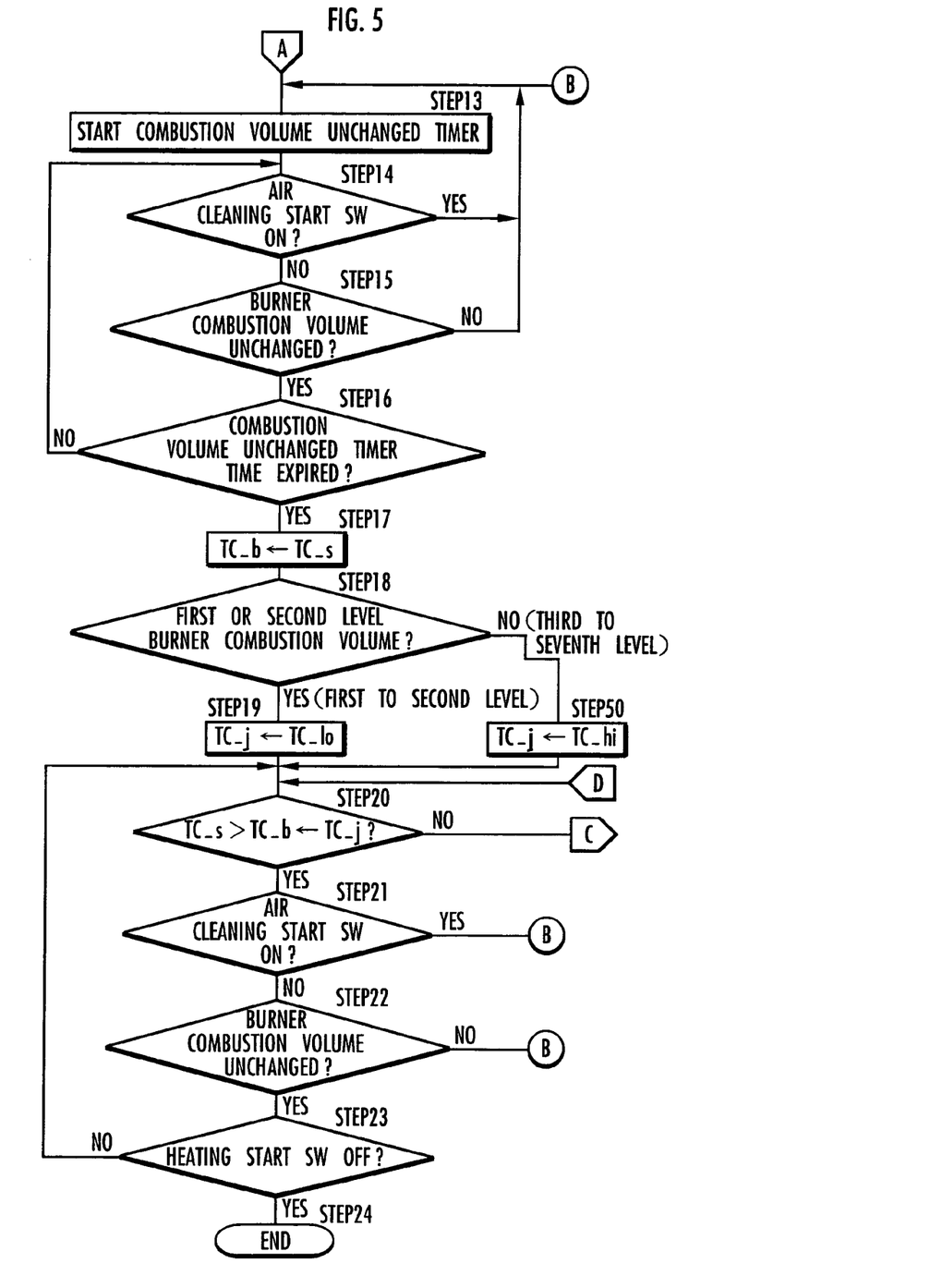

The processing at STEPs 13 to 17 in FIG. 5 is performed by the reference value setup unit 42. At STEP 13, the reference value setup unit 42 starts a combustion quantity unchanged timer, and performs the loop at STEPs 14 to 16. That is, the reference value setup unit 42 determines at STEP 14 whether the air cleaning start switch 51 has been manipulated, determines at STEP 15 whether the combustion quantity for the burner 11 has been changed, and waits at STEP 16 until the time designated for the combustion quantity unchanged timer has expired.

When the air cleaning start switch 51 has been manipulated at STEP 14, or when the combustion quantity for the burner 11 has been changed at STEP 15, program control branches to STEP 13, and the combustion forced halt unit 40 restarts the combustion quantity unchanged timer. As a result, when the mode is shifted from the "independent heating mode" to the "synchronous operating mode", or from the "synchronous operating mode" to the "independent heating mode" through manipulation of the air cleaning start switch 51, following the mode shift, there is a wait until the period (e.g., thirty seconds) set for the combustion quantity unchanged timer has elapsed.

When the combustion quantity for the burner 11 is changed, following the change there is a wait until the period set for the combustion quantity unchanged timer has elapsed. When the time designated for the combustion quantity unchanged timer has expired at STEP 16, at STEP 17 the combustion forced halt unit 40 designates, as the reference value TC_b, the present thermoelectromotive force TC_s generated by the thermocouple 16.

The processing at STEPs 18 to 23 and STEP 50 is performed by the combustion forced halt unit 40. When the combustion quantity for the burner 11 at STEP 18 is at the first or second level, at STEP 19, the combustion forced halt unit 40 designates the determination level TC_j as TC_lo for a small combustion quantity. When the combustion quantity for the burner 11 at STEP 18 is at a third to seventh level, program control branches to STEP 50, and the combustion forced halt unit 40 designates the determination level TC_j as TC_hi (<TC_lo) for a large combustion quantity.

Then, the combustion forced halt unit 40 performs the loop at STEPs 20 to 23 to monitor the combustion state of the burner 11. When, at STEP 20, the present thermoelectromotive force TC_s generated by the thermocouple 16 is reduced from the reference value TC_b by an amount equivalent to the determination level TC_j or more (TC_s≦TC_b−TC_j), program control is shifted to STEP 60 in FIG. 6.

At STEP 60, the combustion forced halt unit 40 starts an oxygen depletion timer to prevent an erroneous detection due, for example, to electric noise, and performs the loop at STEPs 61 to 63 and STEP 70. The period set for the oxygen depletion timer is, for example, ten seconds. When the air cleaning start switch 51 has not been manipulated at STEP 61, when the combustion quantity for the burner 11 has not been changed at STEP 62, when at STEP 70, the thermoelectromotive force TC_s generated by the thermocouple 16 is lower than the reference value TC_b by an amount equivalent to the determination level TC_j, or more, and when the time set for the oxygen depletion timer has expired at STEP 63, program control advances to STEP 64 and the combustion forced halt unit 40 halts combustion at the burner 11 to stop the heating operation.

Through this processing, combustion at the burner 11 is prevented from continuing in the degraded combustion state. At this time, the display control unit 45 uses the warning lamp 22 to provide an error notification.

When, At STEP 61, the air cleaning start switch 51 is manipulated to start/halt the "air cleaning operation", and when at STEP 62 the combustion quantity for the burner 11 is changed, the combustion condition for the burner 11 is also changed, so that program control branches to STEP 13 in FIG. 5 and the reference value TC_s and the determination level TC_j are redesignated. Then, when at STEP 70, the present thermoelectromotive force TC_s generated by the thermocouple 16 is higher than a level that is lower than the reference value TC_b by the determination level TC_j (TC_s>TC_b−TC_j), program control branches to STEP 20 in FIG. 5 to again perform the loop at STEPs 20 to 23.

When the air cleaning start switch 51 is manipulated at STEP 21 in FIG. 5, and when the combustion quantity for the burner 11 is changed at STEP 22, the combustion condition at the burner 11 is also changed, so that program control branches to STEP 13, and the reference value TC_b and the determination level TC_j are redesignated. Thereafter, when the heating start switch 50 is turned off at STEP 23, program control advances to STEP 24 and the "heating operation" is terminated.

FIGS. 7(a) to 7(c) are graphs showing a change in the thermoelectromotive force TC generated by the thermocouple 16 after the reference value TC_b and the determination level TC_j have been decided. The vertical axis represents the thermoelectromotive force TC, and the horizontal axis represents the time t. Shown in FIG. 7(a) is an example wherein the stable reference value TC_b and the determination level TC_j are decided in the "independent heating mode"; thereafter, this mode is continued. In this example, the thermoelectromotive force TC begins to drop at a time $t_{10}$, whereat a reduction in the indoor oxygen density is begun, and at a time $t_{11}$, whereat the thermoelectromotive force TC is reduced, from the reference value TC_b, by the determination level TC_j, combustion at the burner 11 is halted by the combustion forced halt unit 40.

In FIG. 7(b) is shown an example wherein the stable reference value TC_b and the determination level TC_j are decided in the "independent heating mode", and thereafter, the "air cleaning operation" is started and the mode is shifted to the "synchronous operating mode". As is shown in FIG. 2, since the heating fan 13 and the air cleaning fan 7 take in air through the common air intake 15, at a time $t_{20}$, whereat the "air cleaning operation" is begun, the volume of the air drawn in through the common air intake 15 by the heating fan 13 and supplied to the burner 11 is reduced.

As a result, the thermoelectromotive force TC generated by the thermocouple 16 is reduced, and when the combustion state of the burner 11 is monitored using the stable reference value TC_b and the determination level TC_j that have been decided in the "independent heating mode", combustion at the burner 11 is halted by the combustion forced halt unit 40 at a time $t_{22}$ whereat the reduction in the thermoelectromotive force TC, from a time $t_{21}$ whereat the thermoelectromotive force TC is leveled off and stabilized is smaller than the determination level TC_j. In this case, even though the indoor oxygen density is not yet low enough to require the halting of combustion at the burner 11, it is determined that the oxygen density is low, and combustion at the burner 11 is halted, i.e., an "early stop" occurs.

In FIG. 7(c) is shown an example wherein the processing in FIG. 5 is performed. When the stable reference value TC_b and the determination level TC_j are decided in the "independent heating mode", and thereafter, the "air cleaning operation" is started and the mode is shifted to the "synchronous operating mode", at STEP 21, in FIG. 5, program control branches to STEP 13.

At a time $t_{30}$, whereat the time designated at the combustion quantity unchanged timer is up at STEP 16, at STEP 17, the reference value TC_b is redesignated, and at STEP 19 or STEP 50, the determination level TC_j is redesignated. As a result, at a time $t_{31}$, whereat the thermoelectromotive force TC generated by the thermocouple 16 drops, from the redesignated reference value TC_b, the equivalent of the determination level TC_j or more, combustion at the burner 11 is halted by the combustion forced halt unit 40. In this case, combustion at the burner 11 can be halted while the occurrence of an "early stop", described above, can be prevented.

Second Embodiment

A second embodiment of the present invention will now be described. The configuration of a space heater for this embodiment is the same as that for the first embodiment, with the exceptions that, while referring to FIG. 3, a first memory 70 (corresponding to the first storage unit according to the invention) and a second memory 71 (corresponding to the second storage unit according to the invention) are provided, and that a reference value setup unit 42 employs a different method for designating a reference value TC_b.

While referring to FIG. 3, reference values TC_m1(1) (for first level) to TC_m1(7) (for seventh level) are stored in the first memory 70 in consonance with the individual combustion quantities (first level to seventh level) for a burner 11 in the "independent heating mode". Further, reference values TC_m2(1) (for first level) to TC_m2(7) (for seventh level) are stored in the second memory 71 in consonance with the combustion quantities (first level to seventh level) for the burner 11 in the "synchronous operating mode". When the "heating operation" is started by manipulating the heating start switch 50, an initial value of 0 is set as the reference values TC_m1(1) to TC_m1(7) in the first memory 70 and the reference values TC_m2(1) to TC_m2(7) in the second memory 71.

Figure 8:
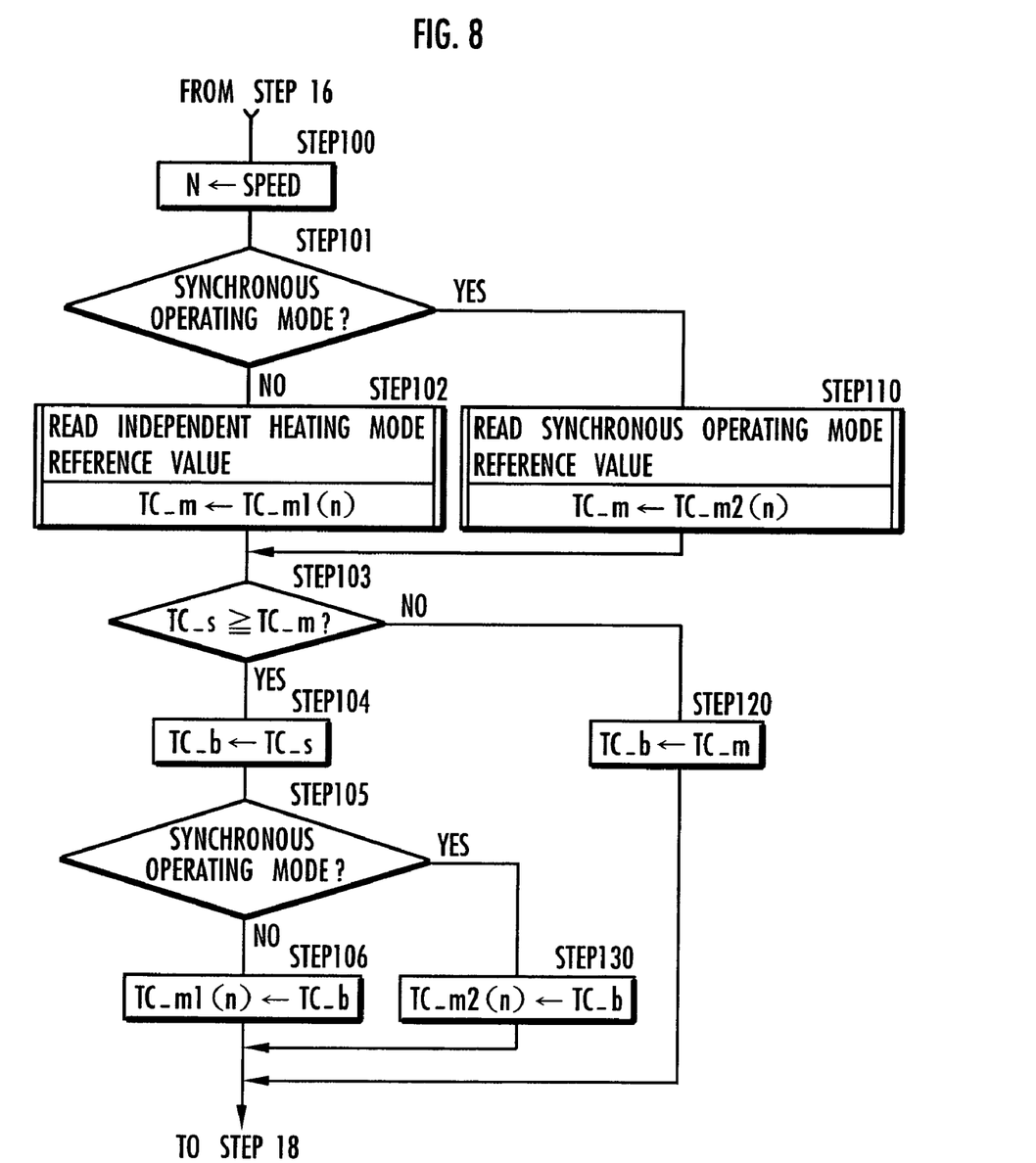
FIG. 8 is a flowchart showing the operation of a space heater according to a second embodiment of the present invention.

A reference value setup unit 42 performs the processing in the flowchart in FIG. 8 to designate a reference value TC_b. Processes other than the designation of the reference value TC_b are the same as those for the first embodiment shown in FIGS. 4 to 6.

First, at STEP 100, the reference value setup unit 42 substitutes, into a variable n, the present combustion quantity (one of first level to seventh level) for the burner 11. When the present mode is the "synchronous operating mode" at STEP 101, program control branches to STEP 110, or when the present mode is the "independent heating mode", program control advances to STEP 102. At STEP 102, the reference value TC_m1(n) for the nth level in the "independent heating mode" is read from the first memory 70, and is substituted into a variable TC_m. On the other hand, at STEP 110, the reference value TC_m2(n) for the nth level in the "synchronous operating mode" is read from the second memory 71, and is substituted into the variable TC_m.

At STEP 103, the reference value setup unit 42 compares the present thermoelectromotive force TC_s generated by a thermocouple 16 with the variable TC_m. When the present thermoelectromotive force TC_s is equal to or greater than the variable TC_m, program control advances to STEP 104, and the reference value setup unit 42 designates as the reference value TC_b the present thermoelectromotive force TC_s. Whereas when at STEP 105 the present mode is the "synchronous operating mode", program control branches to STEP 130 and the reference value TC_b is stored in the second memory 71 to update the value TC_m2(n). When, however, the present mode is the "independent heating mode", program control advances to STEP 106 and the reference value TC_b is stored in the first memory 70 to update the value TC_m1(n).

When, at STEP 103, the present thermoelectromotive force generated by the thermocouple 16 is smaller than the variable TC_m, program control branches to STEP 120 and the reference value setup unit 42 designates the variable TC_m as the reference value TC_b. In this case, the reference values TC_m1(1) to TC_m1(7), in the first memory 70, and TC_m2(1) to TC_m2(7), in the second memory 71, are not updated.

When, at STEP 103, the present thermoelectromotive force TC_s generated by the thermocouple 16 is smaller than the preceding stable value TC_m for the combustion quantity that is currently designated, it can be assumed that the combustion state of the burner 11 is either unchanged or has been degraded (the indoor oxygen density is either unchanged or reduced). In this case, at STEP 120, the preceding stable reference value TC_m is determined to be a stable reference value TC_b, and the reduction in the thermoelectromotive force TC generated by the thermocouple 16, which is continued from the state having the preceding combustion quantity, can be monitored.

When, at STEP 103, the present thermoelectromotive force TC_s generated by the thermocouple 16 is equal to or greater than the preceding stable reference value TC_m that is held for the present combustion quantity, it can be assumed, for example, that the space wherein the gas space heater 1 is located is well ventilated and that the indoor oxygen density has been increased, so that the combustion condition is changed and the combustion state of the burner 11 is satisfactory.

In this case, program control advances to STEP 104, and the reference value setup unit 42 designates the present thermoelectromotive force TC_s generated by the thermocouple 16 as a new reference value TC_b. Thus, based on the new reference value TC_b that is designated in accordance with the altered combustion condition, the combustion forced halt unit 40 can detect a combustion abnormality and halt combustion at the burner 11.

In the "independent heating mode", at STEP 106, the reference value TC_b that is stored as the value TC_m1(n) in the first memory 70, in consonance with the nth speed, is updated, or in the "synchronous operating mode", at STEP 130, the reference value TC_b that is stored as the value TC_m2(n) in the second memory 71, in consonance with the nth speed, is updated. As a result, a value (TC_m) is obtained that is required at STEP 103 for comparison with the reference value in the next "heating operation" at the nth speed.

In the first embodiment, at STEPs 13 to 16 in FIG. 5, the elapse of the time allocated for the combustion quantity unchanged timer is awaited in order to determine whether combustion at the burner 11 has been stabilized. As another method, when the change in the thermoelectromotive force generated by the thermocouple 16 is continued within a predetermined range and for a predetermined period of time, it can be determined that combustion at the burner 11 has been stabilized.

Further, for the above embodiments, the gas space heater has been employed as a space heater according to the invention. However, the present invention can also be applied for a space heater that employs another fuel, such as kerosene.

Furthermore, for the gas space heater in the above embodiments, the air intake is used in common for the air cleaning fan and the heating fan. However, when an air intake is provided separately in the vicinity of the air intake for the air cleaning fan, the volume of the air drawn in by the heating fan may be changed as the air cleaning fan is started or halted. Also in this case, the present invention is effective.

What is claimed is:

1. A space heater comprising:
   a burner;
   a heating fan for taking in air through a first air intake and supplying the air to the burner, and for propelling, through a warm air grille, air heated by the burner;
   an air cleaner;

an air cleaning fan for taking in air through a second air intake located in the vicinity of the first air intake and supplying the air to the air cleaner, and for propelling, through a clean air grille, air purified by the air cleaner;

an operation controller for selectively performing either a heating operation, during which combustion occurs at the burner while the heating fan is being operated, and an air cleaning operation, during which the air cleaner and the air cleaning fan are operated, in a synchronous operating mode, or only the heating operation in an independent heating mode;

a thermocouple for generating a thermoelectromotive force consonant with the combustion state of the burner;

a combustion forced halt unit for halting combustion at the burner when, during a heating operation, the thermoelectromotive force generated by the thermocouple is lower, by a predetermined determination level, than a predetermined reference value; and a reference value setup unit for, when the mode is shifted from the independent heating mode to the synchronous operating mode and a thermoelectromotive force generated by the thermocouple is stabilized thereafter, determines that the thermoelectromotive force is the reference value.

2. A space heater according to claim 1, wherein a single air intake is provided for use in common as the first air intake and the second air intake.

3. A space heater according to claim 1, further comprising:

a first storage unit for storing the reference value used for the independent heating mode, wherein, when the mode is shifted from the independent heating mode to the synchronous operating mode, the reference value setup unit stores, in the first storage unit, the reference value for the last independent heating mode, and when the mode is next shifted from the synchronous operating mode to the independent heating mode and then the thermoelectromotive force generated by the thermocouple is stabilized, compares the thermoelectromotive force with the reference value stored in the first storage unit, wherein, when the thermoelectromotive force is greater than the reference value stored in the first storage unit, the reference value setup unit determines that the thermoelectromotive force is a reference value for the present independent heating mode, and updates the reference value in the first storage unit, wherein, when the thermoelectromotive force is equal to or smaller than the reference value stored in the first storage unit, the reference value setup unit maintains the reference value stored in the first storage unit as a reference value for the present independent heating mode.

4. A space heater according to claim 3, further comprising:

a unit for changing combustion quantity for the burner at a plurality of levels, wherein the reference value setup unit stores the reference value for the independent heating mode in the first storage unit for each of the combustion quantities for the burner at the individual levels, and wherein, when the mode is shifted from the synchronous operating mode to the independent heating mode, the reference value setup unit compares the thermoelectromotive force generated by the thermocouple at the time that the thermoelectromotive force is stabilized after the mode shift, with the reference value that is consonant with a combustion quantity for the burner that is stored in the first storage unit at the time of the mode shift.

5. A space heater according to claim 1, further comprising:

a unit for changing combustion quantity for the burner at a plurality of levels; and a first storage unit for storing the reference value for the independent heating mode, wherein, when the combustion quantity for the burner is changed in the independent heating mode, the reference value setup unit stores, for each of the combustion quantities for the burner at the individual levels, the reference value just before the change of the combustion quantity, wherein, when the combustion quantity for the burner is next changed, the reference value setup unit compares the thermoelectromotive force generated by the thermocouple at the time that the thermoelectromotive force is stabilized thereafter, with the reference value that is consonant with the combustion quantity for the burner after the change of the combustion quantity and is stored in the first storage unit, wherein, when the thermoelectromotive force is greater than the reference value stored in the first storage unit, the reference value setup unit determines that the thermoelectromotive force is a reference value for the present independent heating mode, and updates the reference value in the first storage unit, and wherein, when the thermoelectromotive force is equal to or smaller than the reference value stored in the first storage unit, the reference value setup unit maintains the reference value stored in the first storage unit as a reference value for the present independent heating mode.

6. A space heater according to claim 1, further comprising:

a second storage unit for storing a reference value for the synchronous operating mode, wherein, when the mode is shifted from the synchronous operating mode to the independent heating mode, the reference value setup unit stores, in the second storage unit, the reference value for the last synchronous operating mode, and when the mode is next shifted from the independent heating mode to the synchronous operating mode and then a thermoelectromotive force generated by the thermocouple is stabilized, compares the thermoelectromotive force with the reference value stored in the second storage unit, wherein, when the thermoelectromotive force is greater than the reference value stored in the second storage unit, the reference value setup unit determines that the thermoelectromotive force is a reference value for the present synchronous operating mode, and updates the reference value in the second storage unit, and wherein, when the thermoelectromotive force is equal to or smaller than the reference value stored in the second storage unit, the reference value setup unit maintains the reference value in the second storage unit as a reference value for the present synchronous operating mode.

7. A space heater according to 6, further comprising:

a unit for changing a combustion quantity for the burner at a plurality of levels, wherein the reference value setup unit stores the reference value for the synchronous operating mode in the second storage unit for each of the combustion quantity for the burner at the individual levels, and wherein, when the mode is shifted from the independent heating mode to the synchronous operating mode, the reference value setup unit compares the thermoelectromotive force generated by the thermocouple at the time that the thermoelectromotive force is stabilized after the mode shift, with a reference value that is consonant with a combustion quantity for the burner and is stored in the second storage unit.

8. A space heater according to claim 1, further comprising:

a unit for changing a combustion quantity for the burner at a plurality of levels; and a second storage unit for storing a reference value for the synchronous operating mode, wherein, when the combustion quantity for the burner is changed in the synchronous operating mode, the reference value setup unit stores, for each of the combustion quantities for the burner at the individual levels, in the second storage unit, a reference value used just before the change of the combustion quantity, wherein, when the combustion quantity for of the burner is next changed, the reference value setup unit compares the thermoelectromotive force generated by the thermocouple at the time that the thermoelectromotive force is stabilized, with the reference value that is consonant with the combustion quantity and is stored in the second storage unit, wherein, when the thermoelectromotive force is greater than the reference value stored in the second storage unit, the reference value setup unit determines that the thermoelectromotive force is a reference value for the present synchronous operating mode, and updates the reference value in the second storage unit, and wherein, when the thermoelectromotive force is equal to or smaller than the reference value stored in the second storage unit, the reference value setup unit maintains the reference value in the second storage unit as a reference value for the present synchronous operating mode.

9. A space heater according to claim 1, further comprising:

a combustion quantity change unit for changing a combustion quantity for the burner; and a determination level change unit for reducing the predetermined determination level as the combustion quantity for the burner is increased.

* * * * *